(12) United States Patent
Vigna

(10) Patent No.: US 12,481,748 B2
(45) Date of Patent: Nov. 25, 2025

(54) WEB FRAMEWORK DESIGNED FOR SECURE LOCKED DOWN BROWSERS

(71) Applicant: David Michael Vigna, Sterling, VA (US)

(72) Inventor: David Michael Vigna, Sterling, VA (US)

( * ) Notice: Subject to any disclaimer, the term of this patent is extended or adjusted under 35 U.S.C. 154(b) by 171 days.

(21) Appl. No.: 17/448,998

(22) Filed: Sep. 27, 2021

(65) Prior Publication Data

US 2022/0164431 A1 May 26, 2022

Related U.S. Application Data

(60) Provisional application No. 63/198,946, filed on Nov. 24, 2020.

(51) Int. Cl.
| | |
|---|---|
| *G06F 40/143* | (2020.01) |
| *G06F 3/0482* | (2013.01) |
| *G06F 21/44* | (2013.01) |
| *G06Q 10/067* | (2023.01) |

(52) U.S. Cl.
CPC ............ *G06F 21/44* (2013.01); *G06F 3/0482* (2013.01); *G06F 40/143* (2020.01); *G06Q 10/067* (2013.01)

(58) Field of Classification Search
CPC ...... G06F 21/44; G06F 40/143; G06F 3/0482; G06Q 10/067
See application file for complete search history.

(56) References Cited

U.S. PATENT DOCUMENTS

| | | | |
|---|---|---|---|
| 7,340,604 B2 | 3/2008 | Hewett et al. | |
| 8,381,113 B2* | 2/2013 | Kamdar | G06F 9/451 |
| | | | 715/714 |
| 8,635,701 B2 | 1/2014 | Hilaiel et al. | |
| 8,756,617 B1 | 6/2014 | Boodman et al. | |
| 8,826,421 B2 | 9/2014 | Luo et al. | |
| 9,055,048 B2 | 6/2015 | Shepherd et al. | |
| 9,356,963 B2 | 5/2016 | Hockings et al. | |
| 9,813,429 B2 | 11/2017 | Kass | |
| 10,079,854 B1 | 9/2018 | Scott et al. | |
| 10,313,112 B2 | 6/2019 | Fitch et al. | |
| 10,469,534 B2 | 11/2019 | Qureshi et al. | |
| 10,592,683 B1 | 3/2020 | Lim et al. | |
| 2002/0083171 A1 | 6/2002 | Hoogenboom et al. | |
| 2005/0155027 A1* | 7/2005 | Wei | G06F 8/61 |
| | | | 717/176 |
| 2005/0210380 A1* | 9/2005 | Kramer | G06T 11/00 |
| | | | 715/255 |
| 2006/0173981 A1 | 8/2006 | Zhang et al. | |

(Continued)

*Primary Examiner* — Beau D Spratt
(74) *Attorney, Agent, or Firm* — Dunlap Bennett & Ludwig, PLLC

(57) ABSTRACT

A method of validating a web browser when scripting is disabled, the method includes validation by default through using an automatically defined database metadata catalog to programmatically build forms with validation and validation messages based on the metadata, business logic, and application validation logic. The present invention creates client and server-side validation based on validation rules stored in tables and metadata types along with column sizing and business logic defined by the data modelers or developers. The method mimics a JavaScript framework with user interface and style elements when the client browser's settings are set to disable scripting.

6 Claims, 4 Drawing Sheets

(56) References Cited

U.S. PATENT DOCUMENTS

| | | | |
|---|---|---|---|
| 2009/0019313 A1 | 1/2009 | Pokala et al. | |
| 2009/0064311 A1 | 3/2009 | Clark et al. | |
| 2011/0131567 A1* | 6/2011 | Tirk | G06Q 30/0242 717/176 |
| 2012/0011489 A1* | 1/2012 | Murthy | G06F 21/577 717/126 |
| 2014/0089109 A1* | 3/2014 | Ashbaugh | G06F 40/103 705/14.73 |
| 2016/0182563 A1 | 6/2016 | Sambandam et al. | |
| 2016/0328370 A1* | 11/2016 | Laborczfalvi | G06F 40/143 |
| 2018/0046602 A1* | 2/2018 | Sisson | G06F 16/972 |

* cited by examiner

A WEB PAGE

INPUT FORM–EXAMPLE TRAVEL INVOICE APP

- EMPLOYEE NAME | COMPANY EMAIL | COMPANY PHONE
- CLIENT MEETING|TRAINING|ETC ▽ | MM/DD/YYYY START DATE | MM/DD/YYYY END DATE
- START LOCATION | END LOCATION | ☐ CHECK FOR ROUND TRIP

TRAVEL FEES
- TAXI AMOUNTS | TOLLS AMOUNTS | MM/DD/YYYY | UPLOAD +

HOTEL
- MM/DD/YYYY START DATE | MM/DD/YYYY END DATE | HOTEL AMOUNT | UPLOAD +

MEALS
- BREAKFAST AMOUNT | LUNCH AMOUNT | DINNER AMOUNT | MM/DD/YYYY | UPLOAD +

AIRLINE
- MM/DD/YYYY START DATE | MM/DD/YYYY END DATE | ☐ USED AIRLINE MILES
- AIRLINE NAME | TICKET AMOUNT | ☐ HAD LAYOVER OVER 4HRS | UPLOAD +

UPLOADED FILES
TRAVEL FEES UPLOADED FILES | HOTEL UPLOADED FILES | MEAL UPLOADED FILES | AIRLINE UPLOADED FILES

SUBMIT

WEB FRAMEWORK DESIGNED FOR SECURE LOCKED DOWN BROWSERS

CROSS-REFERENCE TO RELATED APPLICATION

This application claims the benefit of priority of U.S. provisional application No. 63/198,946, filed 11 Nov. 2020, the contents of which are herein incorporated by reference.

BACKGROUND OF THE INVENTION

The present invention relates to secure locked down browsers and, more particularly, a web framework designed for a secure locked down browser.

Modern web frameworks (like jQuery and Bootstrap) use JavaScript for web elements and allow developers to code form validation and display icons.

When a browser is locked down to address the Security Technical Implementation Guides (STIG) web elements the browser does not run if scripting or cross site scripts is disabled; for example, icons may not display, elements may not hide or show, form validation, media players, calendar date pickers and third-party content may not work due to the STIG settings. And modern frameworks may use cross site scripting of third-party libraries for style and icons, and modern web elements may use JavaScript for event listeners for user actions. Document Object Model (DOM) Events are a signal that something has occurred, or is occurring, and can be triggered by user interactions or by the browser, wherein client-side scripting languages like JavaScript can register various event handlers or listeners on the element nodes inside a DOM tree, such as in HTML, XHTML, XUL, and SVG documents.) As the security level is set higher in Internet Explorer or Firefox per the Lockdown Guides, more functions stop working due to Scripts that are blocked.

ColdFusion form validation tags can be manually coded by a developer but use client-side JavaScript and do not run when scripting is disabled. The current method allows the developer to code the validation on the form; however, fields validation logic can be defined differently by multiple developers missing or excluding business validation logic. Some forms did not include validation but only displayed a formatting or logic label to the end user. Client-side validation checks were coded manually and so did not always run due to scripting disablement due to browser security settings.

Form validation is one of those elements that do not run when scripting is disabled and there is a need to create an easy way to include validation by default, not relying on a developer to properly code default validation rules. There is also a need to allow high-level business logic and low-level application checks to be defined for each application.

In short, scripting frameworks do not fully work when the security setting on browsers is set to disable scripting.

There was a need for a web framework to be designed for a secure locked down browser. The present invention uses ColdFusion to demonstrate this modified framework that supports a secure locked down browser with disabled JavaScript that most frameworks use to apply or remove framework element classes. Moreover, the present invention utilizes ColdFusion and Bootstrap to enable form validation and alert, warning, and error conditional checks, and display a different status icon with an input-form Application and, presumably, that the JavaScript enabled check variable is set to disabled.

Specifically, the present invention uses database catalog metadata to create the form with default validation. There is a form that allows for defining the business data model validation logic and another form for developers to define any custom application logic. The workflow includes client-side ColdFusion JavaScript validation for the browser that have enabled JavaScript. The server-side validation uses the three checks (alert, warning, and error conditional checks), default database catalog validation, business data model validation, and custom application form logic validation. The data model validation of the database catalog check is used before inserting it into the database. Form labels validation and validation messages are defined at the database metadata table and the business data model for the form fields. The present invention also includes an extensible markup language-based vector image format, such as SVG icon module, to conditionally change the display icons and colors used as PKIs in reports.

Not only does the simple validation work under the new process, but the present invention has expanded the validation to default metadata validation including high-level and low-level checks that can be standardized and reused by selecting predefined checks and allow custom expression to be saved and reused.

Furthermore, the present invention embodies both client-side and server-side styles and applies or removes element active class conditions even if scripting is disabled using server-side code. There are multiple configuration tables to automatically set validation variables and checks to apply Bootstrap classes. The form field validation is queried from the tables setting variables which are used to create the forms and conditional statements that will change the alert, warning, and error icons.

Validation by default is defined automatically by using the database metadata catalog. High-level common business logic is defined at the data model to match the ColdFusion data type validation tags. Developers can also add custom low-level form validation to support more complex business logic for each field in the form. All three differently scoped validation rules are used to create variables to define the creation of forms. The form data flow uses the database metadata and ColdFusion validation tags for the first validation checks (client-side validation). The next step for the confirming data page uses all three validation variable scopes (server-side validation) before submitting to the database. Finally, after confirming the data on the page is submitted to insert or update the data (server-side validation) into the database uses ColdFusion validation tags mapped to the database and data model validation logic.

In one embodiment, the present invention uses Cascading Style Sheets language (CSS)-based framework (e.g., Bootstrap) to demonstrate a web framework that mimics a modern JavaScript framework with user interface (UI) and style elements when the client browser's settings are set to disable scripting. A web server or client browser in a secure locked down mode may have security settings that disable scripting. Web element class styles are applied with client side and server-side code to address enabled or disable script settings.

A form validation model is used to programmatically build forms with validation and validation messages based on the metadata, business logic, and application validation logic. Both client side and server-side rules are used to build the form workflow so multiple applications can use standard metadata, business logic with additional application specific validation on browsers that have scripting disabled.

Icons are selected from a database set to memory and stored as variable and used to display form validation status and/or report logic Key Performance Indicators (KPIs) in a tabular report. The conditional logic in the report column for KPIs is displayed based on the data model and application logic defined within the models and can be reused by multiple applications using the same column. This programmatic approach allows for a form validation, conditional checks, and status displays adding icons that do not display when browsers have scripting disabled.

SUMMARY OF THE INVENTION

In one aspect of the present invention, a method of validating a web browser when scripting is disabled, the method including applying server-side code styles to one or more user interface style elements displayed on a web page.

In another aspect of the present invention, a method of validating a web browser when scripting is disabled, the method including programmatically creating a form validation wherein data source metadata is used for a datatype validation, wherein the form validation includes one or more validation message; applying a business logic to the form validation; applying a business logic to the one or more validation messages; applying a validation logic to the form validation; applying a validation logic to the one or more validation messages, wherein the business logic is configured to display data confirmation or error to the user if the data was successfully inserted and saved.

In yet another aspect of the present invention, the method of validating a web browser when scripting is disabled further includes the following conditionally modifying extensible markup language-based vector image format display icons, wherein said modification are retrievable stored in a database; and setting said modification to variables in memory in such a way that conditional form validation logic from metadata, business, and application validation model logic selectable display a one or more variables of said modifications, wherein said modification includes one or more color status codes, wherein said display is based on an icon status, a warning status or a failure status per application mapped to one or more data field, wherein said modifications are defined in one or more tables.

These and other features, aspects and advantages of the present invention will become better understood with reference to the following drawings, description and claims.

BRIEF DESCRIPTION OF THE DRAWINGS

FIG. 1 is a schematic view of an exemplary embodiment of an input form of the present invention;

FIG. 2 is a schematic view of an exemplary embodiment of an input form of the present invention; specifically, an exemplary travel invoice application with status icons displayed;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 2:
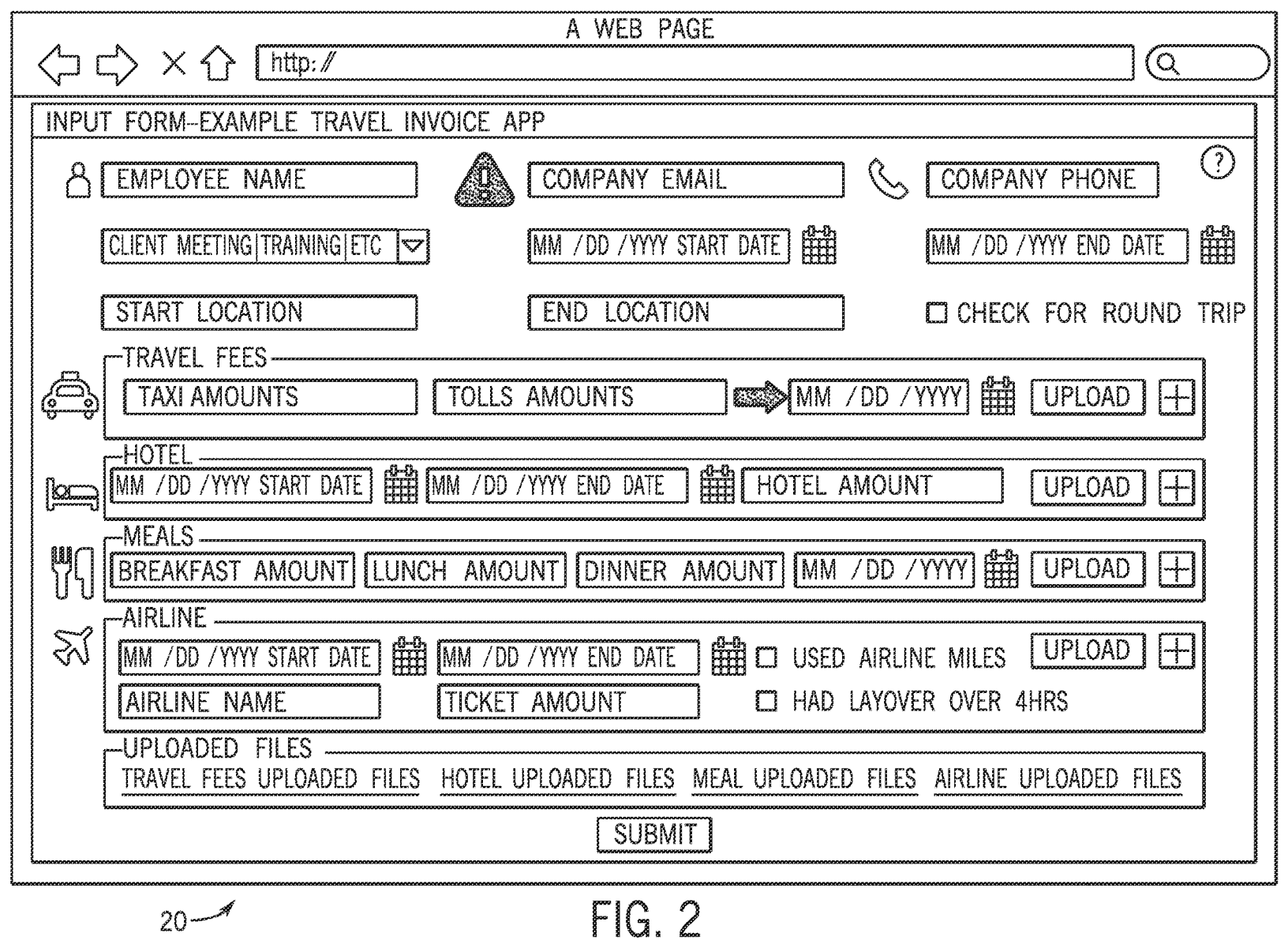
Figure 3:
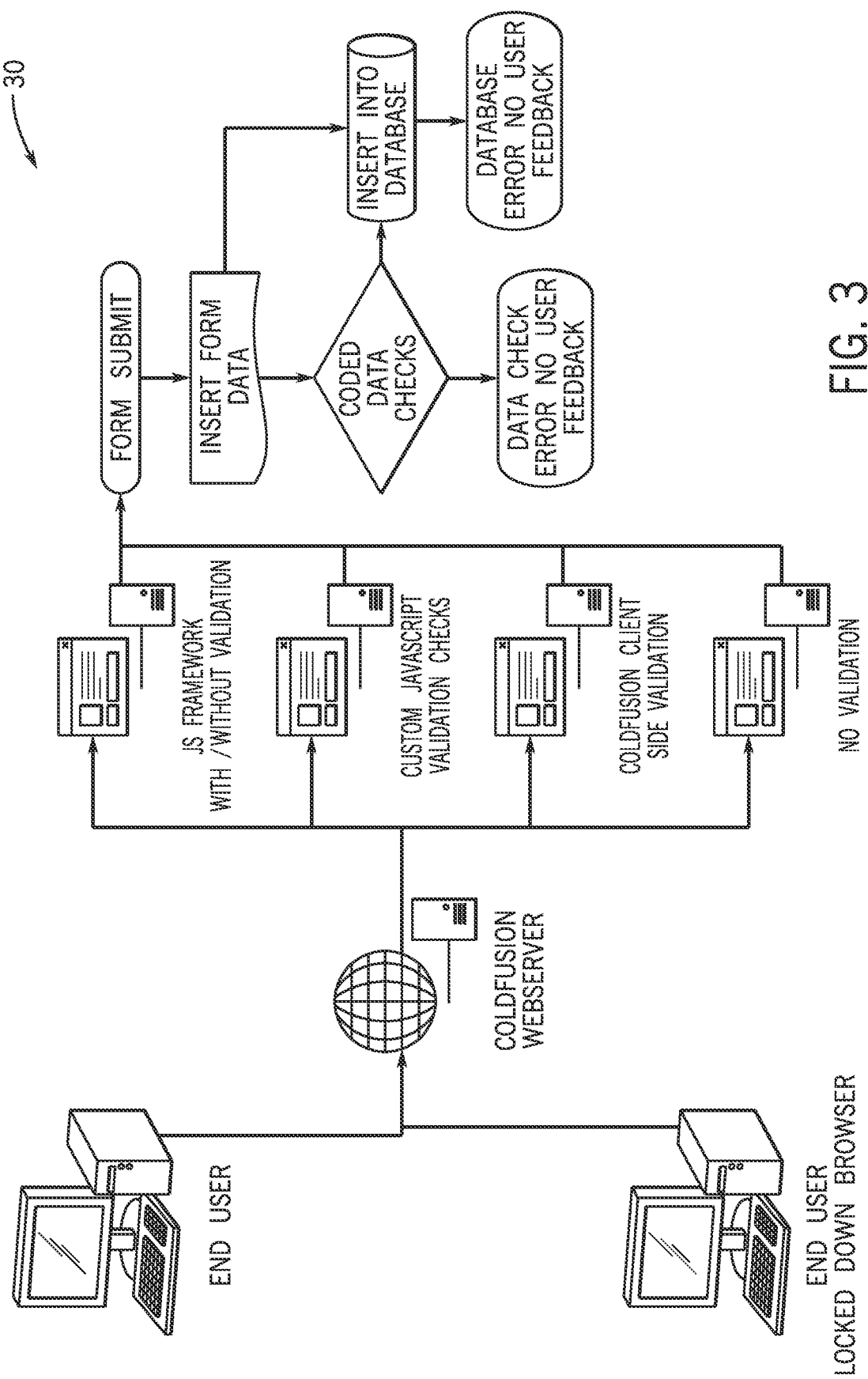
FIG. 3 is flow chart of an exemplary embodiment of a current framework of the present invention.
Figure 4:
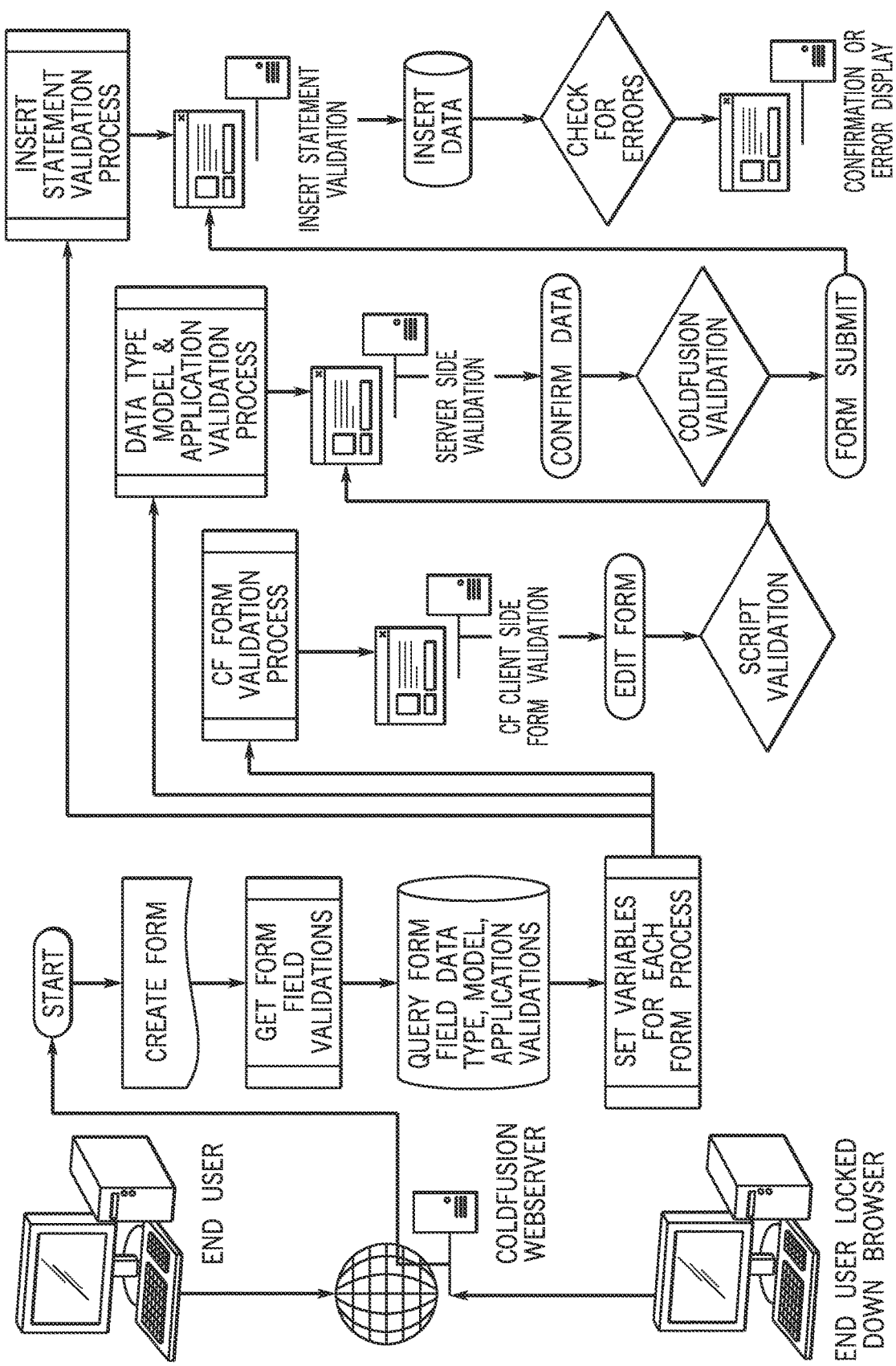
FIG. 4 is flow chart of an exemplary embodiment of the present invention.

Referring now to FIGS. 1 through 4, the present invention may include the following system components: FIG. 1 an overall web framework input form for secure locked-down browsers invention 10; FIG. 2 an input form-example travel invoice application with status icons displayed 20; FIG. 3 current frameworks-developer manually codes form validation 30; and FIG. 4 default data type, data model, custom application scope validations 40 wherein after a page loads and a user enters data the present invention creates client and server side validation based on validation rules stored in tables and metadata types along with column sizing and business logic defined by the data modelers or developers. The stored information about of data fields is used to create table layouts on the page and validation rules for the input fields using data type checks with variable mapping of different database types to ColdFusion validation. MySQL, Microsoft SQL Server and Oracle data types are mapped within a table to define which ColdFusion data type validation to use from both the data form validation and the data insert statement.

Mapping Data Types and Model Validation to Client-side Validation using a Table to Create the Variables—Exemplary Travel Invoice Application Input Form Company Email: The string field of 254 that is defined in the database as not null would be defined in the form input as a max length of 254 and a required field. The validation type of email would be selected from the model validation rules to complete defining the input form field and map to the ColdFusion validation tags.

Taxi Amount: The amount field maybe defined as a float, number or numeric based on the data type of different databases. The data type would map to the ColdFusion named field type and defined to match the database source data type. The Model validation may have a range limit to cap expenses.

Date Fields: The same logic holds true for date fields. The data type is checked at the database if it is required. The data modeler would define the date format and the input tag and ColdFusion Validation rules in the model. That table would be queried, and variables set to be used to programmatically create the form file with validation for each form.

Client-side Validation Rules and Field Labels and Tips Displayed to the End-user—Exemplary Form with Validation Alerts and Warnings Submitting the form for validation server-side code.

Due to client-side validation not working if scripting is disabled, the present invention has a confirmation check page. If the validation checks alert, warn or error, the end user can edit the data and try to validate the data again.

The data type and model validation variables are created to check data within coded "IF statements" blocks. Each check confirms that the data field matches the data type and length, the business and application validations models are used to apply business validation rules and application validation rules. The application validation rules could include date ranges plus or minus days or months and the current date.

For this example, the invoice date of the payment for the travel invoice may need to fall within the range of the travel dates. Amounts for the travel application may use a lookup of per diem rates based on the travel location and for a company email check an extra check for the company domain someone@company.com may be checked. Both data types and length may be checked using ColdFusion validation tags and regular expressions can add extra application validation.

The difference with the current method is that the present invention stores this validation by default based on the database metadata about the table. The present invention may allow the modeler to define the ColdFusion data type with form inputs stored in a table, and allows the developer to define regular or complex logic for the custom validation checks pre application.

Default Data Type, Data Model, Custom Application Scope Validations

The insert page uses the variables defined with the validation rules and ColdFusion tags mapped to check data before inserting into the database. This applies to creating the files that insert, update any information. One extra step can be included to archive the data action and insert a row into an archive table to automatically create an audit trail for system administrators and auditors for data changes if the table requires detailed auditing.

How the Present Invention Works

The present invention uses mapping tables to define data types from different data sources to Coldfusion validation and custom expressions. The metadata table defines the information about the table data types, size, and if they are required. The data model defines standard company datatype rules, and the application validation table defines custom, simple, or complex data rules for each form field validation rule.

The data type validation is by default based on the data source and the data catalog. The data modeler can use a form to define and match the data validation per the data type and ColdFusion validation. An example would be a date may be USdate, or eurodate formatting validation. The application developer can further define an expression or simple query to restrict data validation. An example for the Travel Invoice date range logic may be today's date minus 30 days for employees or minus 60 days for managers.

The metadata stored within the validation rules are used to create generic validation rules based on the metadata datatype for that column. Developers can also add custom expressions they map to data types. This allows for extra custom field validation that would rule as server-side validation.

Meta Data tables are used to store validation variables and joined to fields used within forms. The Data Modeler and Developers may add or update data validation rules for extra custom validation rules.

The mapping tables used for validation data types and model validation are necessary. Developers may also create custom application form-field validation rules but this is optional.

Data models can define data validation rules within a form for the data models. The defining of the validation for the forms is used to defined high-level business logic used when the insert or updated statement is validated before any inserts into the database.

Additionally, the tables used to define the validation logic can be used to gather requirements for each field condition check. The data can be queried easily to create requirement documents and used for periodic review when business logic changes. It may take a long time for developer to identify spots in code within forms and review many lines of code. By storing the validation rules in tables reports can be easily created and run against all applications and forms the organization uses.

Furthermore, the present invention contemplates normally created data tables with conditional background colors within cells to display a status color, so when reports are printed background colors may not print. In a secure environment end user may not have access to change print settings to allow the printing of background colors. JavaScript functionality regarding the showing, hiding, and switching of icons are disabled when scripting is disabled. The SVG module along with conditional checks can be used to create data tables with conditional color-coded icons for KPIs in reports. The present invention is enabled to use SVG icons queried from a database and set as images on the page allowing the status icon to print.

The web application, or webapp, of the present invention is an application that is accessed via a web browser over a network (e.g., Internet, mobile phone network, etc.). The web application can also be a computer software application that is coded in a browser-supported language (such as HTML, CSS, JavaScript, Java, PHP, etc.) and reliant on a common web browser to render the application executable. Web application code is typically stored on servers. At launch, the browser uses a web address such as a Uniform Resource Locator (URL) to fetch the web application code. The code is then downloaded to the computing system and the application is executed, either inside the browser or using the browser functionality. Over the course of execution, additional code can be downloaded and executed. The computing system may also store the web application code locally, in which case the web application URL points to a local file. The web application may also be preloaded on the computing system prior to delivery. This is common with, for example, preloaded applications on cell phones or laptop computers. The present invention may utilize any appropriate web application, including future web applications.

It should be understood, of course, that the foregoing relates to exemplary embodiments of the invention and that modifications may be made without departing from the spirit and scope of the invention as set forth in the following claims.

What is claimed is:

1. A method of generating a web form with default validation from a metadata database for a secure locked down browser when scripting is disabled, the method comprising:
    retrieving metadata from a database catalog, wherein said metadata comprises data type definitions;
    mapping said metadata to predetermined validation rules including data type validation tags associated with a web-application development computing platform and custom validation expressions;
    programmatically generating one or more form fields based on said mapped metadata;
    outputting a validated web form configured for display on a secure locked down browser with scripting disabled, wherein business logic is configured to display data confirmation or error to the user if the data was successfully inserted and saved,
    conditionally change one or more icons that are in an extensible markup language-based vector image format, wherein said modification are retrievable stored in a database; and
    setting said modification to variables in memory in such a way that conditional form validation logic from metadata, business, and application validation model logic selectable display a one or more variables of said modifications.

2. The method of claim 1, further applying server-side validation logic incorporating high-level business rules and low-level custom application logic to said generated form fields.

3. The method of claim 2, wherein each form field includes one or more associated validation messages.

4. The method of claim 1, wherein said modification includes one or more color status codes.

5. The method of claim 4, wherein said display is based on an icon status, a warning status or a failure status per application mapped to one or more data field.

6. The method of claim 5, wherein said modifications are defined in one or more tables.

* * * * *